United States Patent [19]

McConachy

[11] Patent Number: 5,062,765
[45] Date of Patent: Nov. 5, 1991

[54] HIGH TOWER WIND GENERATING SYSTEM

[76] Inventor: H. Reginald McConachy, 2/9 David Street, Balaclava 3183, Victoria, Australia

[21] Appl. No.: 542,578

[22] Filed: Jun. 25, 1990

[51] Int. Cl.$^5$ ............................................. F03D 7/04
[52] U.S. Cl. .................................... 415/4.3; 415/4.5;
415/908; 416/9; 416/132 B; 52/30; 52/65;
52/114; 74/89.15; 74/412 TA; 74/424.8 R;
403/58; 403/74; 464/125
[58] Field of Search .................. 415/2.1, 4.2, 4.3, 4.4,
415/4.5, 905, 907, 908; 416/9, 132 B; 74/89.15,
412 TA, 424.8 R; 403/51, 58, 74; 464/125;
212/176; 187/2, 6, 95; 52/30, 31, 726, 64, 65,
146, 152, 40, 114

[56] References Cited

U.S. PATENT DOCUMENTS

| | | | |
|---|---|---|---|
| 1,034,760 | 8/1912 | Brackerbohm | 52/726 |
| 1,562,781 | 11/1925 | Moser | 187/6 |
| 2,086,002 | 7/1937 | Shepard | 187/6 |
| 2,169,165 | 8/1939 | Reedy | 416/9 |
| 3,366,251 | 1/1968 | Strnad | 212/176 |
| 3,663,044 | 5/1972 | Cantreras et al. | 403/51 |
| 3,944,839 | 3/1976 | Carter | 416/9 |
| 4,011,694 | 3/1977 | Langford . | |
| 4,087,990 | 5/1978 | Gillette . | |
| 4,134,707 | 1/1979 | Ewers . | |
| 4,166,596 | 9/1979 | Mouton, Jr. et al. | 415/2.1 |
| 4,184,084 | 1/1980 | Crehore . | |
| 4,217,501 | 8/1980 | Allison . | |
| 4,309,006 | 1/1982 | Biscomb | 415/4.5 |
| 4,408,954 | 11/1983 | Earle | 416/132 B |
| 4,792,700 | 12/1988 | Ammons . | |
| 4,942,537 | 7/1990 | Verry | 52/726 |

FOREIGN PATENT DOCUMENTS

| | | | |
|---|---|---|---|
| 2138500 | 2/1973 | Fed. Rep. of Germany | 415/2.1 |
| 0051970 | 4/1980 | Japan | 416/9 |
| 0088966 | 7/1981 | Japan | 415/4.3 |

OTHER PUBLICATIONS

Civil Engineering Magazine, Jul., 1959, pp. 35–37, "Baltimore's Candelabra."

Primary Examiner—Edward K. Look
Assistant Examiner—Christopher M. Verdier
Attorney, Agent, or Firm—Laurence R. Brown

[57] ABSTRACT

A more efficient wind power generation system is afforded by extending tower heights to several hundred meters to operate wind catching rotors and generators aligned with the wind direction at various levels along the tower. With multiple vertically cascaded wind generators and higher velocity winds at higher elevations greater power is produced in a system characterized by a small footprint. This is particularly enhanced by a single mast construction, which is supported by a dynamic guy wire tensioning system to accomodate varying lateral forces primarily caused by the change in direction of wind loads on the tower. The mast is built from modular sections connected together at articulated joints, between which the various rotors are stationed. Thus, the accumulated torques and lateral stresses in the tower are minimized and do not accumulate along the length of the tower thereby to lengthen life expectation and reduce the chances for catastrophic failure in the presence of the higher velocity winds encountered. Also maintenance at such heights necessary where movable parts are present, is enhanced by an internal lift in the mast structure and an uppermost work platform with a rotatable lifting crane.

4 Claims, 4 Drawing Sheets

HIGH TOWER WIND GENERATING SYSTEM

TECHNICAL FIELD

This invention relates to wind generating systems and more particularly it relates to the construction of towers of a height of several hundred meters, extended into higher velocity wind regions for more efficient generation of power.

BACKGROUND ART

Wind generator systems with associated tower structure are well known in the art. The status of such prior art is exemplified by a brief discussion of the following U.S. Patents.

Various types of wind responsive generators are known. For example, in U.S. Pat. No. 4,792,700; Dec. 20, 1988 issued to J. L. Ammons, a wind actuated rotor is disposed at the top of a single mast tower supported by guy wires. Such systems are inefficient both as to use of ground space and as to the utility of the available wind. Particularly at spots where prevailing winds exist, fields of such units may be disposed, and separate towers for each rotor limit the number of generators in such fields, increase the land costs and the tower costs per rotor. In this system, the use of a single mast tower is desirable to keep the footprint small and to keep tower costs down. However, this system is only operable at relatively modest heights of the rotor and cannot support a rotor at such heights that higher velocity winds are available, as unaffected by the shear friction with the ground at lower levels.

It has been known to cascade vertically on a single tower structure several rotors. This is advantageous in producing a smaller footprint per rotor, and in more effectively using available wind. However it introduces much greater stresses up the tower, which are difficult to deal with, particularly with a single mast type of tower. Consider that the rotors to be effective must catch and resist the wind, thereby providing great lateral forces at up-tower locations. Since wind tower generation systems must be able to withstand high velocity gusting winds, the towers therefore need to be rugged and costly. In particular consider the problems with a single mast type of tower, wherein lateral bending stresses in steel bracing tends to fatigue the metal. Thus, very costly and heavy tower structure is necessary, and in general such systems could not be made to practically operate in the presence of higher velocity winds available at greater tower heights, particularly with the added stresses of multiple cascaded rotor generator systems spaced along the height of the tower. For example W. D. Gillette in U.S. Pat. No. 4,087,990, May 9, 1978, departs from a single mast type tower to accomodate cascaded rotor structures. Similarly R. Crehore in U.S. Pat. No. 4,184,084, Jan. 15, 1980, uses a multiple masted pyramid arrangement. Nevertheless, neither system could be made practically operable at significant heights.

As taught in U.S. Pat. No. 4,217,501; Aug. 12, 1980 by W. D. Allison, increased efficiency may be achieved by aligning rotors with the wind direction. That desirable feature is offset however by the low heights and necessity to use multiple supporting towers for disposal of several rotors.

A desirable feature of U.S. Pat. No. 4,134,707; Jan. 16, 1979; M. H. Ewers is the ability to mount cascaded rotors in modular units at various tower heights. However this wind generation system is incapable of operation at any significant height above the ground, and because of a common vertical drive shaft and associated bearings has no ability to flex in the presence of high wind loads. Thus tower construction must be very rigid and expensive.

Another desirable prior art feature is outlined in U.S. Pat. No. 4,011,694; Mar. 15, 1977; F. E. Langford, namely a dynamic guy wire system for balancing the lateral forces on a tower. This system is for protection of individual guy wires to prevent overloading, and thus permits smaller guy wires to be used or protects from sudden wind gusts, etc. that exceed the capacity of the individual guy wires. However in this system a large number of guy wires is necessary to distribute the entire load, and there is no provision for the tower to flex or bend in the presence of peak loads.

A problem not adquately addressed in the prior art is that of maintenance of a wind powered generator system. Because of movable rotors, scheduled maintenance, such as for lubrication etc. is required in addition to maintenance required by catastrophic failure of any part of the system. Towers, and in particular single mast towers are not generally adapted to efficient and effective maintenance. The time of repair is critical also to the continuous generation of power, which should be interrupted as little as possible. This maintenance problem is amplified with greater tower heights. Consider for example the necessity to replace rotor structure or generator structure at heights of several hundred meters above the ground. This requires special handling equipment such as cranes, which are not conventionally available for operating at such heights, and which if provided would be extremely costly.

Accordingly it is a general object of the invention to improve the state of the wind generating art by resolving the foregoing deficiencies of the prior art and producing a more powerful and efficient generation system with small footprint adaptable to use in wind generating fields at prime locations with limited space, such as in mountain passes, and the like. Other objects, features and advantages of the invention will be found throughout the following description, claims and accompanying drawings.

DISCLOSURE OF THE INVENTION

This invention thus provides a wind generating system arranged with a vertically oriented single mast tower carrying a plurality of vertically cascaded rotors for wind powered generators. The tower has a series of connected modular mast sections each supporting a resident rotor. Joints between the modular sections are provided with articulation means for permitting some position adjustment in response to lateral forces due to wind gusts and the like. These joints permit a limited degree of relative angular movement between two adjacent modular mast sections. Thus, accumulated stresses from many sections of a very tall tower are isolated to reduce fatigue and chances for catastrophic failure.

An accompanying guy wire system guyed to a disc fastened to the top of each mast section immediately below the flexible coupling support the tower in its vertical posture. A tensioning system permits each guy wire to respond dynamically to loading, for example from wind gusts, which in combination with the articulated joint structure provides a stable vertical single mast tower that will support a plurality of cascaded wind rotors and accompanying generator means along its height which may typically be several hundred meters.

For power generation efficiency, the cascaded rotors provide a large generating capacity with a small footprint area about the single mast tower. For maximizing the effective use of available wind, the rotors are directionally oriented with changes in wind direction, and the tower and rotor structure extends far enough off the ground to reach higher velocity winds not slowed down by the shear friction forces of the ground impediments such as trees, buildings or windmill fields.

The power generation system has features for facilitating maintenance, necessary with rotary machinery and in the event of cathastrophic failure of tower mounted equipment such as rotors or accompanying generator equipment. Thus, a service platform at the top of the tower with a crane facilitates handling and replacement of rotor assemblies for example, and a lift within the hollow single mast permits repair personnel attention to lubrication and other maintenance activities at any position on the tower.

Other features and details will follow throughout the remaining specification, drawings and claims.

BRIEF DESCRIPTION OF THE DRAWINGS

Like reference characters relate to similar features throughout the several views of the drawings, in which.

THE PREFERRED EMBODIMENTS

Figure 1:
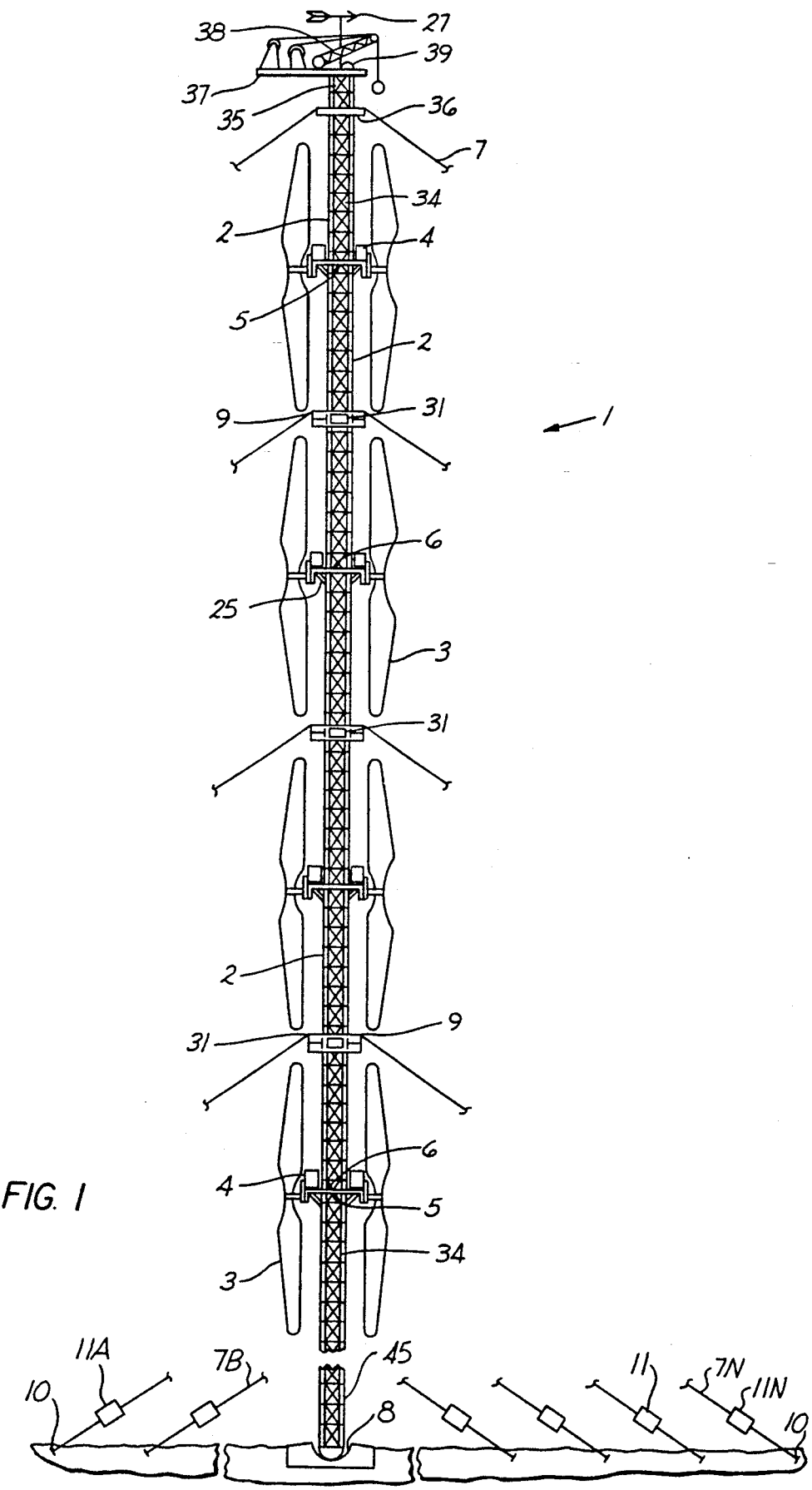
FIG. 1 is a side view sketch, partly foreshortened, of a tower with accompanying wind power generation features, as afforded by a preferred embodiment of the invention.

FIG. 1 shows the single mast of the tower and accompanying wind powered generator system afforded by this invention. The tower has a series of modular mast sections 2 coupled together at articulated joints 9, hereinafter discussed in more detail. Each section 2 supports wind catching rotors or propellers 3 arranged on a base 5 and platform 6 suitably supported by a tower bracing and support structure 25 in substantially mid-section position so that rotors 3 will not interfere with guy wires 7 coupled to the intervening joints 9 between adjacent sections. Rotary electric power conversion units or dynamos 4 are preferably coupled to each separate rotor 3 at its site on the tower for wiring into a power system (not shown) in a conventional manner.

Typically four (or more) guy wires 7 are connected about the tower at the several vertical elevations between the joints 9 and corresponding ground support structure 10. Intervening turnbuckles 11 are serially interspersed in the guy wires for adjustment of tension and length in a manner to be later discussed.

The tower is mounted by suitable base support structure containing some means such as mating concave and convex steel plate bearing structure 8 on the tower and ground respectively that permits the lowermost tower section to move or deviate a small amount from vertical as required to meet lateral forces including the tension in the lowermost set of guy wires and dynamic forces from wind gusts and the like. Note that the guy wires 7 are angled to prevent interference with rotors 3, which may be vertically cascaded closely together along the entire height of the tower, with the exception that the intial ground contact mast section 45 or sections may be devoid of rotors, and could have longer modular mast sections.

At each joint 9, articulation means 31 is interposed to similarly permit adjoining tower sections to be relatively moved and adjusted over a small and confined degree of vertical misalignment in response to lateral forces imposed on the tower structure.

The mast frame is substantially square and hollow to accomodate a lift shaft 34 for transporting maintenance workers and materials. The lift cage 35 by means of winch 39 provides access to the rotatable maintenance platform 37 at the top of the shaft. It carries the jib crane 38 so that machinery may be raised and lowered to desired positions along the mast. The wind vane 27, which may be supplemented by others at different mast heights determines the direction of the wind and aids in the orientation of the rotors 3 in alignment with the wind direction. Other instruments such as wind velocity sensors and inclination sensors to show the angle of departure of any mast section from vertical are also placed at appropriate positions along the mast for use in controlling the power generation system and the tower guy wire support system.

Figure 2:
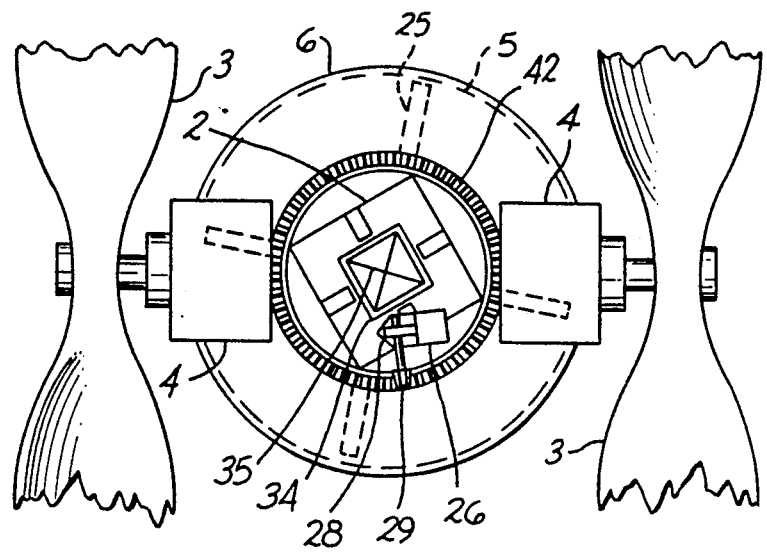
FIG. 2 is a fragmental top view, into the tower axis, of a mechanism for positioning wind catching rotors in alignment with wind direction.

FIG. 2 shows in more detail the rotor mount stations positioned substantially midway in the tower mast sections 2. The rotor generator units 4 are coupled to the two rotors 3 on diametrically opposite sides of the mast. One rotor is contra-rotary to the other, so that the power output from the rotor on the leeward side of the mast is not greatly lessened by the deflection of the air stream by the rotor on the windward side. The pairs of rotor-generator sets are rotatable to find the wind direction and are mounted on platforms 6 supported by base 5 and brackets 25 about the tower 2, with internal lift cage 35 shown in its hollow interior shaft 34.

The ring gear 42 positions the rotor-generator assemblies about the mast as driven by pinion gear 29 by means of reversible electric motor 26 with suitable reduction gearing 28 such as a worm gear. The ring gear 42 and rotor-generator assemblies 3, 4 may all be affixed to the platform 6 for rotation on base 5. The rotors are thus faced directly into the air stream by a conventional mechanism responding to the weather vane (27) to keep the rotors dynamically in position to efficiently use the available wind power.

Figure 3:
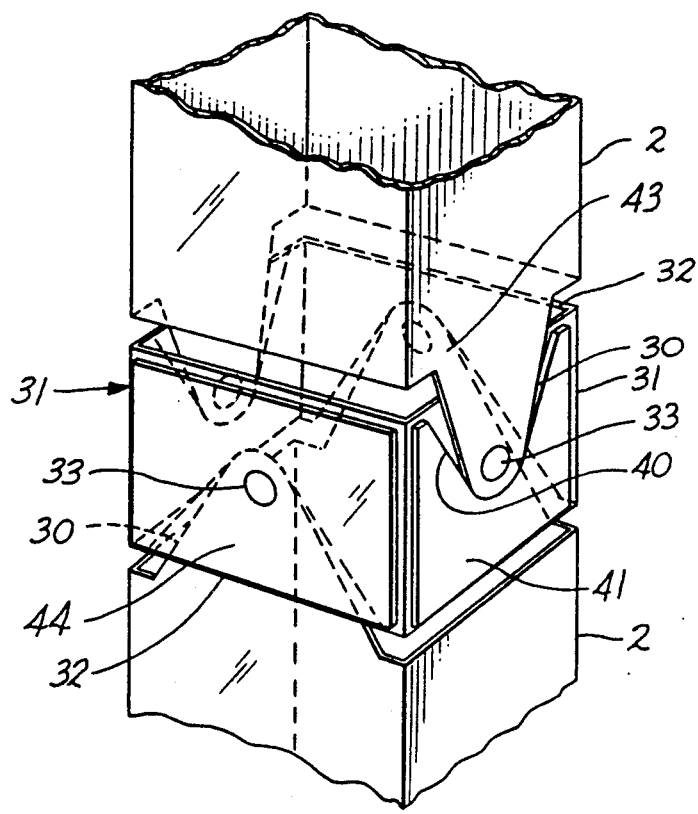
FIG. 3 is a perspective side view sketch of a preferred embodiment of an articulated joint between adjoining mast section modules afforded by the invention.

In FIG. 3, the articulated coupling joint between the two adjacent mast sections 2 is shown. Pairs of yokes 43, 44 having tapered and rounded end structure 30 at the ends of the mast sections 2 are positioned on different faces of the square mast profile perpendicular to each other, to fit within the steel plate faces 32 of the connecting joint assembly 31. These faces 32 are welded to both the inside and outside of the bearing plates 41 which receive and journal the yoke ends 30. Thus the yokes may pivotably move a small and confined amount limited by the angled stops 40 of the bearing plate structure. The entire block 31 coupling joint is thus a universal coupling joint permitting a confined degree of relative angular movement between the two adjacent mast sections 2. The yokes may be locked in place in the assembly by the bolts 33 passed through the respective yokes at the pivot axis and secured by lock nuts on the opposite sides of the respective facing plates 32.

Figure 4:
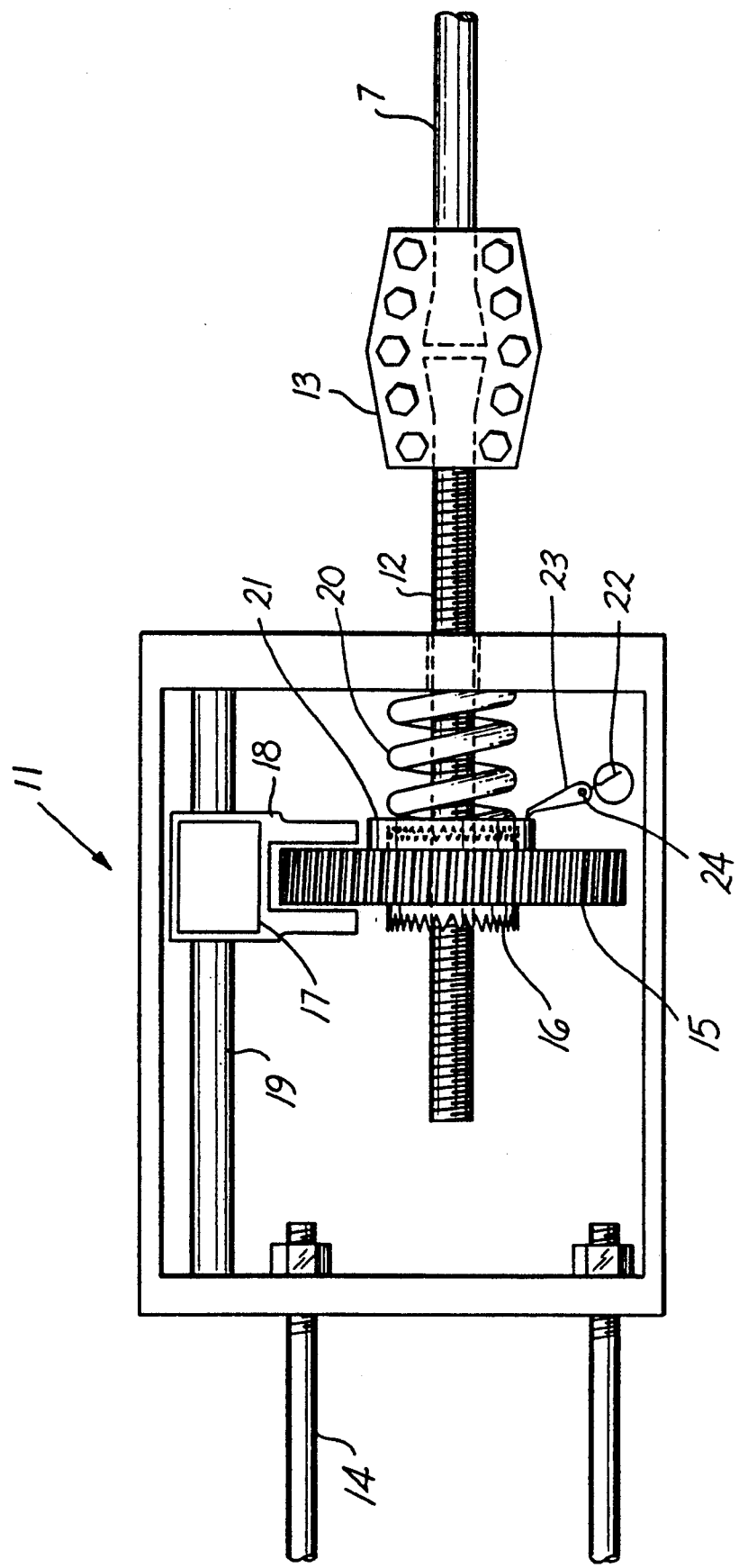
FIG. 4 is a fragmental sketch of a motorized turnbuckle arrangement for adjusting tension in guy wires in accordance with this invention.

A motorized turnbuckle arrangement 11 is shown in FIG. 4 for adjusting tension in the individual guy wires 7. The guy wires are preferably pre-stressed high tensile wire anchored at positions on the mast substantially midway between the arcs defined by adjacent rotor 3 tips (FIG. 1) (or slightly above to compensate for the angle toward the ground). At least four guys 7 are attached to every articulated joint position 9 along the shaft.

The tensioning turnbuckle means 11 is inserted serially in the individual guy wires 7, such as by means of coupler clamp 13 affixed to threaded bolt 12 supported in and coupled by the intermediate turnbuckle arrangement 11 to two anchor rods 14, which may be part of the ground anchor means 10 (FIG. 1).

A worm wheel 15 threaded at its axial center on bolt 12, is turned by reversible electric motor 17 and an intermediate worm drive gear 16. The forked base plate 18 carrying the motor 17 slides along rod 19 and straddles the worm wheel 15 to ensure correct alignment. The worm wheel 15 thus can adjust the length of the guy assembly when desirable. The tension in the guy is determined by one or more strong helical or semi-elliptic springs 20 seated on a ball or roller thrust race 21 as interposed between the worm wheel 15 and the end of the gear box.

The gauge 22, by means of lever 23 pivoted about axle 24, senses the actual tension in the guy wire 7 by contact for example with the face of the thrust race 21. This tension can be used as a parameter for an automatic tension and length control system for the guy wires. There may also be means for adjusting the tension of spring 20 (not shown) in response to a servo system coupled to gauge 22.

Figure 5:
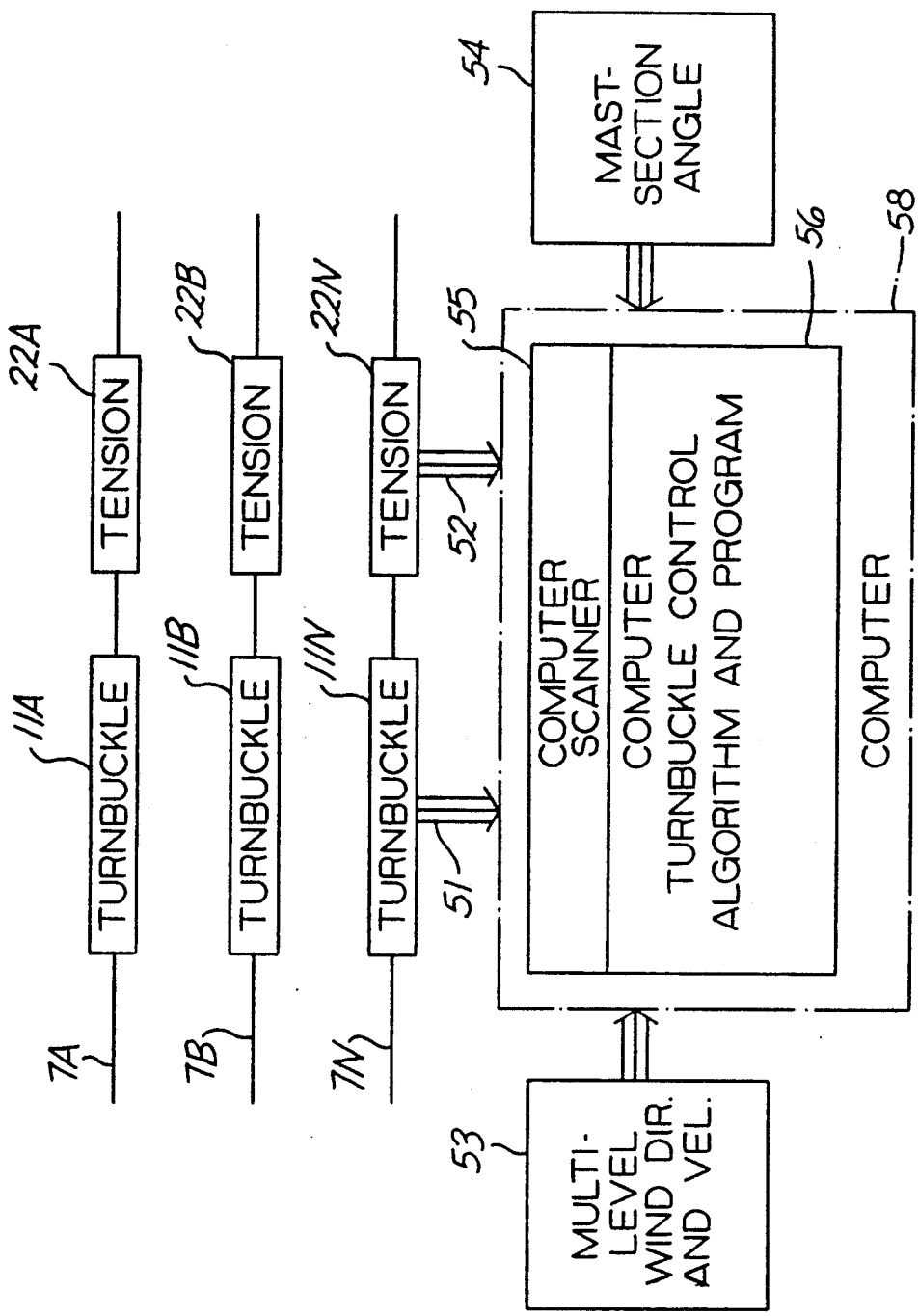
FIG. 5 is a block system diagram of a guy wire tension adjustment system afforded by the invention.

An automated guy wire control system as shown in FIG. 5 will adjust the various guy wire lengths and tensions for changes in dynamic conditions and loading stresses on the tower such as produced by high wind velocities or wind gusts. Thus, a set of guy wires 7A-7N with accompanying turnbuckle assemblies 11A-11N and their accompanying tension sensing devices 22A-22N are schematically shown with corresponding cables 51, 52 leading into the computer scanner system 55, so that individual readings may be monitored and stored for automatic adjustment of system parameters (individual guy wire tension and length) in response to a computer algorithm in the computer turnbuckle program and control section 56, which by way of bi-directional cables 51, 52 send control signals for operation of the guy length motors and corresponding tension control means. Other sensed control parameters that influence the overall system functioning are schematically shown at 53 for feeding in wind direction and velocity at one or more levels on the tower and the vertical attitude of the various articulated mast sections 54. At this stage of the art, the computer system 58 can be suitably programmed in accordance with the engineering conditions as identified by an accompanying algorithm imposed for the individual system design at any particular tower installation.

It is therefore evident that this invention advances the stage of the art with an efficient and operationally feasible wind powered generator system for more effectively using available wind power in small footprint installations.

Accordingly those novel features indicative of the spirit and nature of the invention are set forth with particularity in the following claims.

I claim:

1. A wind generating system comprising in combination:

a vertically oriented tower having a series of interconnected modular mast sections along a vertical height connected by joints, said tower carrying a plurality of wind powered generators with accompanying rotors positioned at a multiplicity of vertical levels between the joints of said interconnected modular mast sections, a guy wire system for supporting the tower against lateral forces at a multiplicity of vertical levels from positions on the tower between the rotors, articulation means connected to define said joints between adjoining modular mast sections permitting the individual mast sections to be relatively angularly moved in response to lateral forces on the tower, and further comprising a maintenance platform supported by the tower at a position above the wind generators with a rotatably positionable crane for use in servicing the wind generators.

2. The system of claim 1 wherein said guy wire system adapts to lateral forces on the tower at various heights by means of tensioning means for adjusting the tension and guy wire length in individual guy wires of the guy wire system dynamically in response to lateral loading of the tower at the respective vertical levels to substantially maintain said mast sections in alignment in the presence of gusting winds.

3. The system of claim 2 wherein said tensioning means comprises motorized turnbuckle means positioned axially in individual guy wires.

4. A wind generating system comprising in combination:

a vertically oriented tower having a series of interconnected modular mast sections along a vertical height connected by joints, said tower carrying a plurality of wind powered generators with accompanying rotors positioned at a multiplicity of vertical levels between the joints of said interconnected modular mast sections, a guy wire system for supporting the tower against lateral forces at a multiplicity of vertical levels from positions on the tower between the rotors, articulation means connected to define said joints between adjoining modular mast sections permitting the individual mast sections to be relatively angularly moved in response to lateral forces on the tower, wherein the tower comprises at the joints a network of bracing members arranged on four sides of a substantially square cross section configuration, and wherein the articulation joint means comprise at each joint a hollow steel block with substantially the same square cross section as the tower interposed between adjacent mast sections, the adjacent mast sections terminate in two tapered universal joint yokes curved at the free ends on only two opposite sides of the mast sections, the respective yokes on adjacent mast sections being oriented perpendicular to each other, the articulation joint means has bearing surfaces with mating curved engagement surfaces for receiving the universal joint yokes merging into angularly tapered sides forming a sector shaped cage permitting an angular motion about a pivot axis in the yokes confined to a limited degree of angular movement.

* * * * *